US010141006B1

(12) United States Patent
Burciu

(10) Patent No.: US 10,141,006 B1
(45) Date of Patent: Nov. 27, 2018

(54) ARTIFICIAL INTELLIGENCE SYSTEM FOR IMPROVING ACCESSIBILITY OF DIGITIZED SPEECH

(71) Applicant: AMAZON TECHNOLOGIES, INC., Seattle, WA (US)

(72) Inventor: Alexandru Burciu, Suceava (RO)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 61 days.

(21) Appl. No.: 15/194,282

(22) Filed: Jun. 27, 2016

(51) Int. Cl.
| | |
|---|---|
| *G06F 17/27* | (2006.01) |
| *G10L 21/16* | (2013.01) |
| *G10L 15/26* | (2006.01) |
| *G10L 15/18* | (2013.01) |
| *G10L 15/01* | (2013.01) |
| *G09B 21/00* | (2006.01) |
| *G10L 21/06* | (2013.01) |
| *G06F 3/0481* | (2013.01) |

(52) U.S. Cl.
CPC ............ *G10L 21/16* (2013.01); *G09B 21/006* (2013.01); *G10L 15/01* (2013.01); *G10L 15/1815* (2013.01); *G10L 15/26* (2013.01); *G06F 3/04812* (2013.01); *G06F 17/27* (2013.01); *G10L 2021/065* (2013.01)

(58) Field of Classification Search
CPC .............................. G06F 17/27; G06F 3/04812
USPC .......................................................... 704/9
See application file for complete search history.

(56) References Cited

U.S. PATENT DOCUMENTS

| | | | | |
|---|---|---|---|---|
| 6,745,163 | B1 * | 6/2004 | Brocious ................. | G10L 13/00 704/260 |
| 7,818,664 | B2 * | 10/2010 | Gordon ............... | G06F 17/2247 715/234 |
| 7,865,365 | B2 * | 1/2011 | Anglin .................... | G10L 17/26 704/257 |
| 8,862,985 | B2 * | 10/2014 | Gallo ................... | G09B 21/008 715/234 |
| 2006/0150110 | A1 * | 7/2006 | Dietl ................. | G06F 17/30899 715/760 |
| 2010/0070872 | A1 * | 3/2010 | Trujillo ............... | G06F 3/04892 715/745 |
| 2014/0058733 | A1 * | 2/2014 | Voorhees ............. | G09B 21/005 704/260 |
| 2014/0195222 | A1 * | 7/2014 | Peevers ................. | G10L 21/003 704/201 |

(Continued)

*Primary Examiner* — Forrest F Tzeng
(74) *Attorney, Agent, or Firm* — Lindauer Law, PLLC

(57) ABSTRACT

Described are techniques for automatically improving the accessibility of webpages and other content using machine learning and artificial intelligence systems. Webpage data may include visual data used to render visible elements and audio data used to render audible elements, such as digitized speech representative of at least a portion of the visible elements. In some cases, text data may be generated based on the audio data. The audio data may be modified based on target text strings, patterns, and characteristics determined in the text data, or the audio data may be analyzed directly. Additionally, user interactions with particular visible elements and corresponding audible elements may be compared. If the user interactions for a visible element exceed the user interactions for a corresponding audible element, the audio data associated with the audible element may be modified.

20 Claims, 9 Drawing Sheets

(56) References Cited

U.S. PATENT DOCUMENTS

2014/0324438 A1* 10/2014 Hofstader ............ G09B 21/006
 704/260
2014/0380149 A1* 12/2014 Gallo ................... G09B 21/008
 715/234

* cited by examiner

ARTIFICIAL INTELLIGENCE SYSTEM FOR IMPROVING ACCESSIBILITY OF DIGITIZED SPEECH

BACKGROUND

The accessibility of webpages and other content to various users may be improved by providing the webpage with code that may be used by a text-to-speech engine, such as a screen reader, to generate audio output in addition to or in place of visual output.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
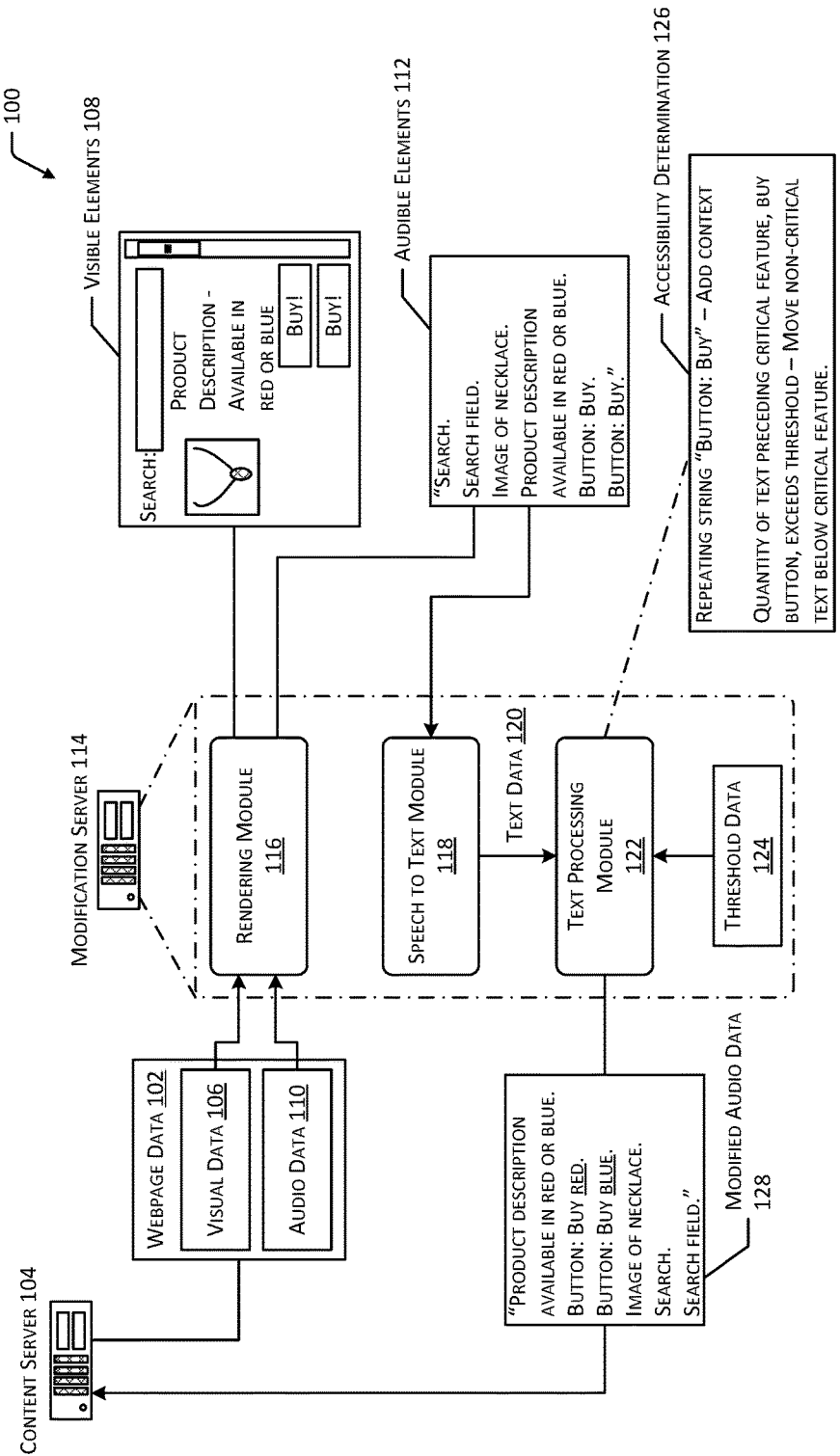
FIG. 1 depicts a system for improving the accessibility of a webpage by modifying audio elements that may be generated when the webpage is output using a screen reader or other text-to-speech software.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

The World Wide Web Consortium (W3C) promulgates various guidelines regarding the accessibility of internet content to users affected by a wide range of disabilities, including blindness and low vision. The guidelines provide, generally, that text and other visible features of webpages should accompanied by code that will cause audio output, such as digitized speech, to be generated when the code is processed by a screen reader or other text-to-speech technology. However, the audio output for some webpages and other types of content may be less understandable than the visual output, or even wholly unusable, independent of compliance with the W3C guidelines. For example, a webpage may include numerous selectable buttons, each corresponding to the purchase of a different version of an item, each of which is described using the same text. The visually rendered version of this webpage may enable a user to differentiate between the buttons based on their visual placement. However, the audio output that accompanies the webpage may include numerous repeated strings of digitized voice for each button, hindering the comprehension of the webpage by a user listening to the audio output. As another example, a webpage or other content may include an image, a table, or a similar feature that may effectively convey information in a visual format, but may be less comprehensible or even unusable when output as digitized speech. As yet another example, a webpage or other content, when output using digitized speech may include excessive quantities of speech that delay a user's ability to access critical portions of the content, or inadequate quantities of speech associated with a critical portion that hinder a user's ability to recognize or locate the critical portion.

Described in this disclosure are techniques for improving the accessibility of webpages and other content by determining repeated speech and other irregularities regarding the quantity and placement of audio output. In some cases, modifications may be made to audio data associated with a webpage or other content automatically, such as through use of artificial intelligence and machine learning systems that analyze and evaluate the audio data. For example, a webpage may include visual data that is used to render visible elements of the webpage, and audio data used to render audible elements, such as digitized speech, representative of at least a subset of the visible elements. Continuing the example, a webpage associated with an item available for purchase may include text descriptive of the item, images depicting the item, a table comparing the item to similar items, and one or more buttons that are selectable to purchase various versions the item. Audio output associated with the webpage may include digitized speech representative of the text, digitized speech describing one or more images, digitized speech representative of the values in one or more fields of the table, and digitized speech representative of the textual label of the buttons. While the audio output associated with the webpage may be descriptive of the visible content, in some cases, the audio output may not be useful to a user. For example, repeated strings of identical digitized speech describing multiple buttons, or strings of digitized speech reciting the text from a table without providing other context, would not be comprehensible to a user that was unable to see the visual output. As another example, a lengthy quantity of digitized speech preceding the button(s) usable to purchase the item may significantly delay a user's ability to purchase a desired item. Similarly, a lack of speech associated with a particular button may cause a user to be unable to locate and access the button.

In some implementations, to determine portions of the audio data that may hinder the accessibility of the webpage, a speech-to-text module may be used to generate text data based on the audio data. The text data may be generated without outputting the audio data as audible sound. For example, the resulting text data may include a textual transcription of at least a portion of the digitized speech or other audible elements associated with the audio data. Continuing the example, a webpage may include text, images, buttons, menus, search interfaces, and other elements. Audio data associated with the webpage may include code that causes the output of digitized speech reciting the text, describing the images, describing the presence of buttons, menus, or other interfaces, reciting text labels associated with the buttons, menus, other interfaces, and so forth. The speech-to-text module may be used to generate a textual transcription of the digitized speech, representing the words that would be output using the digitized speech as alphanumeric data (e.g., text strings). In other implementations, the audio data may be analyzed directly, such as through use of speech or audio recognition, without generating text data.

The text data, if generated, may then be processed, such as by using one or more text filters or other types of text recognition, to determine repeated strings of text, quantities of text that exceed a threshold maximum, quantities of text that fall below a threshold minimum, and so forth. Audio data may similarly be processed using speech recognition, audio filters, and so forth. For example, if a webpage includes multiple buttons having the same descriptive text, the textual transcription of the digitized speech may include repeated strings of speech corresponding to the buttons. As another example, if a webpage includes a large quantity of audio output that precedes the button(s) used to purchase an item, this quantity of audio output may exceed a threshold maximum. As yet another example, if a webpage includes a table, a button, or another type of visible feature, but the corresponding audio data includes no speech or a very small quantity of digitized speech corresponding to this feature, the quantity of text in the textual transcription associated with this feature may fall below a threshold minimum. In some implementations, the threshold maximum and threshold minimum quantities may be determined using machine learning technology. For example, user input indicating portions of audio data that were not useful may be used to determine elements with which an excessive or deficient quantity of audio data is associated. As another example, user interactions with various elements, such as the dwell time of a user, whether a user interacting with the audio data rapidly skips over an element, whether a user interacting with the audio data interacts with an element, and so forth, may be used to determine maximum and minimum quantities of audio data that negatively impact user interactions with elements.

In some implementations, text or audio recognition may be used to determine semantic errors or irregularities in the text data. For example, deep learning and other machine learning techniques, such as clustering techniques, may be used to classify and evaluate text or audible elements and identify semantic irregularities that do not correspond to language that would be understandable to a human user. Identification of a semantic irregularity may include determining that the text corresponding to audio output that recites the values within a table is semantically improper. Continuing the example, the audible recitation of data within a table, recited from left to right, may not form a logical sentence and may not be useful to a user outside of the context provided when visually viewing the table.

In some implementations, the text data may be analyzed by determining differences between the text data and the visual data associated with the webpage. For example, a portion of the visual data may include a feature, such as a button, while the corresponding portion of the text data may include appropriate text descriptive of the button, an absence of text, excessive text, or repeated text. In some cases, a webpage may be conceptually divided into sections (e.g., areas). For example, a user of screen reading software may switch between areas of a webpage to more rapidly browse the content of the webpage without listening to the entirety of the digitized speech associated with each area. Analysis of the text data may include analysis of particular areas of the visually-rendered webpage and the corresponding text. Based on the differences between the visual data and the text data associated with the web page, the audio data used to generate the audio output representative of the webpage may be modified. For example, repeated text strings in the text data that may hinder understanding when output as digitized speech may be deleted. As another example, a large quantity of text that precedes critical elements on a webpage may be moved such that a user may access the critical element prior to hearing the digitized speech associated with the large quantity of text. In some implementations, a notification may be provided to one or more operators or administrators associated with the webpage to solicit user input regarding a modification to the audio data. For example, the user input may include the addition of contextual information regarding a table, additional descriptive speech regarding a series of selectable buttons, and so forth.

When generation of text data is omitted, the audio data associated with a webpage may be analyzed directly to determine quantities of data, such as digitized speech, that are associated with particular elements. Analysis of the audio data may also determine quantities of data that are presented to a user before, after, or proximate to critical features on a webpage, total quantities of data that exceed or fall below threshold quantities, and so forth.

In some implementations, user interactions associated with the visible elements of the webpage and those associated with the audible elements may be used to determine modifications to the audio data. For example, user data indicative of the user interactions of users with the visible output associated with a webpage may indicate a large number of interactions with a particular button, a large quantity of dwell time associated with a particular table, and so forth. If the user data indicative of user interactions with corresponding portions of the audible output does not indicate a similar degree of user interaction, this may indicate that the digitized speech representative of the button, table, or other visible element is not useful or understandable to users. Based on the differences between the user interactions with the visible elements and those with the corresponding audible elements, the audio data associated with the webpage may be modified. In some implementations, the user interactions with the audible elements may exceed those associated with the visible elements. In such cases, the webpage may be modified to include the audible elements when rendering the visible output. Alternatively or additionally, the visible elements may be modified to improve the accessibility or usability thereof. For example, if the user interactions with speech representative of a table or image exceed the user interactions with the table or image itself, the table or image may be replaced or supplemented with text or audio elements. In some implementations, subsequent to modification of a webpage, additional user interactions with the modified version of the webpage may be determined. If the user interactions with the modified elements of the webpage are less than the user interactions with the previous, unmodified version, the modifications to the webpage may be removed.

In some implementations, differences between the text data or audio data for a webpage and the visual elements of the webpage, or differences between user interactions for the visible and audible elements of the webpage, may be represented by a score. Based on the manner in which the score deviates from a threshold value, different notifications or modifications may be performed. For example, if a score does not exceed a threshold, no modification may be undertaken, while scores in excess of a threshold may result in modifications to the audio data associated with the webpage. If the score exceeds a threshold by a significant degree, a notification soliciting user input may be generated. In some cases, the score may be affected by user input. For example, users of a webpage may indicate particular content that was not useful or that hindered comprehension of the webpage or location of particular features, and modifications to the webpage may be performed based at least in part on user input.

FIG. 1 depicts a system 100 for improving the accessibility of a webpage by modifying audio elements that may be generated when the webpage is output using a screen reader or other text-to-speech software. A webpage may be generated based on webpage data 102, received from a content server 104 or other type of computing device. The webpage data 102 may include visual data 106, which may be rendered to cause one or more visible elements 108 to be output to a display device, and audio data 110, which may be rendered to cause one or more audible elements 112 to be output to a speaker or other audio output device. For example, the visual data 106 may cause the output of visible elements 108 such as text, images, and various interactive elements, such as fields, menus, scroll bars, buttons, and so forth. The visual data 106 may also include one or more styles, layouts, formats, and other data that may determine the position of one or more visible elements 108 relative to other visible elements 108. Continuing the example, visual data 106 may include commands, expressed in a markup language, such as HTML5, to draw a box or other visible feature. The audio data 110 may cause the output of audible elements 112, such as digitized speech representative of at least a subset of the visible elements 108. For example, the audible elements 112 may include a transcription of the visible text of a webpage, a description of one or more images, a description of one or more interactive elements, a transcription of text associated with interactive features, such as the text associated with a button, and so forth. In some cases, the audible elements 112 may include one or more sounds other than speech, such as sounds for indicating the presence or absence of particular visible elements 108, relative locations of visible elements 108, and so forth. For example, audio data 110 may include digitized sound formats that include recorded sound, such as wav files and MP3 files. As another example, audio data 110 may include other types of data that may cause the output of sound, that are not necessarily audio recordings, such as midi files.

In some cases, the audible elements 112 associated with a webpage may be less useful to users than the visible elements 108, or may even hinder accessibility of the webpage. For example, the visible elements 108 may include a search interface, a label for the search interface, an image of an item, a product description for the item, and multiple buttons used to purchase different versions of the item. The audible elements 112 that correspond to the visible elements 108 may therefore include a large quantity of digitized speech describing the search interface, the image of the item, and the product description before informing a user of the presence of the buttons used to purchase the item, which may delay a user's ability to access the critical portions of the webpage used to purchase items. Additionally the presence of multiple buttons identified by identical text may result in the audible elements 112 including repeated strings of speech that lack sufficient context for a user to purchase the desired version of the item.

To improve the accessibility of the webpage, a modification server 114 may request the webpage data 102 from the content server 104. While FIG. 1 depicts the modification server 114 as a separate device from the content server 104, in other implementations, one or more of the functions described with regard to the modification server 114 may be performed by the content server 104, itself. Additionally, while FIG. 1 depicts a single modification server 114, the functions described with regard to the modification server 114 may be performed by any number and any type of computing device including, without limitation, mobile devices, set-top boxes, tablet computers, personal computers, wearable computers, servers, and so forth. A rendering module 116 associated with the modification sever 114 may be used to render the webpage data 102 to determine the associated visible elements 108 and audible elements 112. In some implementations, rendering of the webpage data 102 may be performed without outputting the visible elements 108 or audible elements 112. A speech to text module 118 associated with the modification server 114 may determine text data 120 based on the audible elements 112. For example, the audible elements 112 may include digitized speech representative of the visible elements 108 of the webpage, and the text data 120 may include a transcription of the digitized speech.

A text processing module 122 may receive the text data 120 and, based on threshold data 124, determine one or more potential irregularities or deficiencies in the text data 120, represented in FIG. 1 as an accessibility determination 126. For example, the threshold data 124 may indicate particular text irregularities, such as repeated strings of text in the text data 120, semantic errors, a total quantity of text in excess of a threshold maximum, or a total quantity of text less than a threshold minimum. The threshold data 124 may also indicate particular portions of the webpage data 102 that are important features (e.g., critical elements). The text processing module 122 may determine whether the quantity of text within the text data 120 that corresponds to various critical elements is less than a threshold minimum quantity or greater than a threshold maximum quantity. For example, if the audible elements 112 lack sufficient information regarding the presence of a button, the text processing module 122 may determine small quantity of text associated with this critical element in the text data 120. The threshold data 124 may also indicate maximum or minimum quantities of text that may precede or follow critical elements, and maximum separations between text descriptive of a critical element and the critical element, itself. For example, if a large quantity of text, in excess of a threshold maximum quantity, precedes the text descriptive of a particular button, a user listening to the audible elements 112 may be delayed for a significant time listening to the digitized speech represented by the text before learning that the button is present on the webpage.

FIG. 1 depicts an example accessibility determination 126 associated with the text processing module 122, indicating that the text data 120 includes a repeated text string associated with a particular button (e.g., "Repeating string 'Button: Buy'"). The accessibility determination 126 also indicates that the quantity of text preceding a critical feature, the "buy button", exceeds a threshold quantity. Based on these determinations, the accessibility determination 126 indicates that context should be added to clarify the repeated string of text and that non-critical text should be moved below the critical "buy button" feature.

Based on the accessibility determination 126, the text processing module 122 may generate modified audio data 128 to be provided to the content server 104. The modified audio data 128 may include modifications that address one or more of the irregularities determined by the text processing module 122. For example, responsive to a determination that the text data 120 includes a repeated string of text, the text processing module 122 may add additional contextual information to the corresponding portions of the audio data 110, based on information determined from other portions of the text data 120, to form the modified audio data 128. Responsive to a determination that a quantity of text preceding a critical feature exceeds a threshold, the text processing module 122 may move text that precedes the critical feature to an area that follows the critical feature. For example, digitized speech describing a search interface or image may be moved to a location subsequent to the digitized speech describing the presence of a button to purchase an item.

Figure 2:
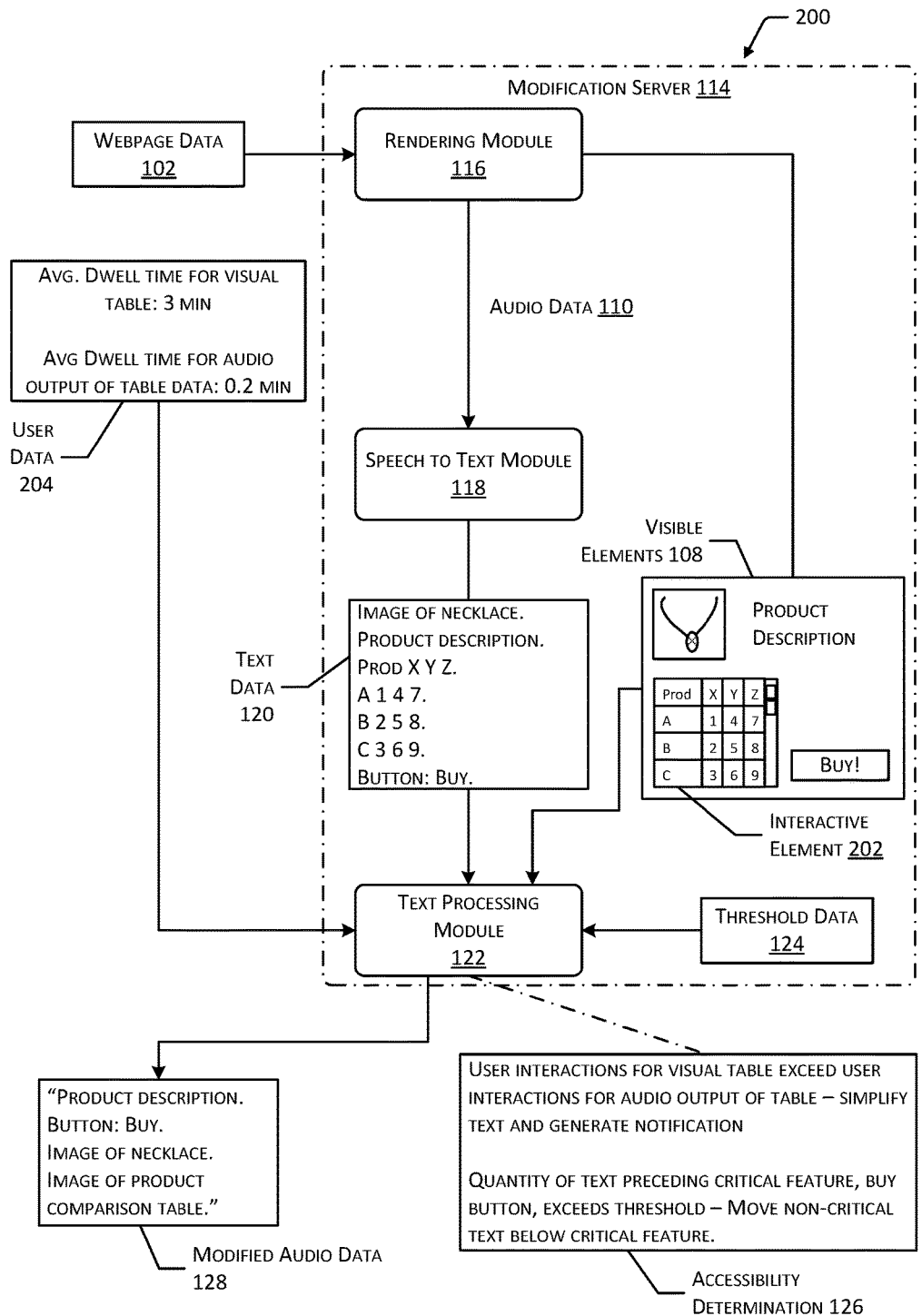
FIG. 2 depicts a system for improving the accessibility of a webpage by modifying audio data based on user interactions with the audible elements and corresponding visible elements.

FIG. 2 depicts a system 200 for improving the accessibility of a webpage by modifying audio data 110 based on user interactions with the audible elements 112 and corresponding visible elements 108. As described with regard to FIG. 1, a rendering module 116 associated with a modification server 114 may receive webpage data 102 associated with a webpage. In other implementations, data used to render types of content other than webpages may be received. The webpage data 102 may include visual data 106 configured to cause the output of visible elements 108, such as text, images, or other graphical elements. FIG. 2 depicts an example set of visible elements 108 that include an interactive element 202, such as a table having a scroll bar or other navigational feature. The webpage data 102 may also include audio data 110 configured to cause the output of audible elements 112, such as digitized speech. A portion of the digitized speech may include speech representative of the values from at least a portion of the interactive element 202. A speech to text module 118 associated with the modification server 114 may generate text data 120 based on the audio data 110 used to generate the audible elements 112. For example, the text data 120 may include a textual transcription of the digitized speech that may be output using the audio data 110.

The modification server 114 may also determine user data 204 indicative of user interactions with one or more portions of the webpage. For example, the user data 204 may include an indication of user dwell times associated with the interactive element 202. FIG. 2 depicts example user data 204 in which the average dwell time for users accessing the visible interactive element 202 is three minutes, while the average dwell time for users that hear the audible elements 112 corresponding to the interactive element 202 is 0.2 minutes. Other user data 204 may include data indicative of user interactions with other portions of webpages or other content. For example, user data 204 may include a count of user dwell times for other portions of a webpage, user click-stream data, user purchase histories, search histories, and browsing histories, user accesses using particular buttons, links, menus, and so forth.

Based on the text data 120, the visible elements 108, the user data 204, and threshold data 124, a text processing module 122 associated with the modification server 114 may generate an accessibility determination 126 indicative of one or more irregularities or unusable portions of the audio data 110, and modified audio data 128 that addresses one or more of the irregularities based on the accessibility determination 126. For example, the text processing module 122 may determine correspondence between the visible elements 108 of the webpage and the text data 120. Continuing the example, the text processing module 122 may determine a quantity of text associated with the interactive element 202 or other portions of the visible elements 108. If the quantity of text associated with a particular visible element 108 exceeds a threshold maximum or falls below a threshold minimum, the audio data 110 corresponding to that text may be modified. As another example, the text processing module 122 may determine that the user interactions for a visible interactive element 202 exceed the user interactions for the digitized speech representative of the interactive element 202 by more than a threshold amount. Based on this determination, the text processing module 122 may modify the portion of the audio data 110 that corresponds to the interactive element 202. In some implementations, the text processing module 122 may provide a notification to one or more operators or administrators requesting user input to modify the audio data 110 related to the interactive element 202. As yet another example, the text processing module 122 may determine that a quantity of text in excess of a threshold quantity precedes a critical element within the webpage, such as a button used to purchase an item. Responsive to this determination, the text processing module 122 may modify the audio data 110.

While FIG. 1 depicts modification of webpage data 102 corresponding to a webpage, which is received from a content server 104, in other implementations, data received from a content server 104 or other source may be modified by a user device receiving the data. For example, the functions of the modification server 114, described with regard to FIG. 1, may be performed by a user device, such as by executing a plug-in or similar instructions. In other implementations, the modification server 114 or another computing device may receive requests from user devices, process webpage data 102 from a content server 104, and provide a webpage including modified audio data 110 to the requesting user device.

FIG. 2 depicts the text processing module 122 generating modified audio data 128 in which a description of an image has been moved from a position preceding a button for purchasing the item to a position subsequent to the button. The modified audio data 128 also replaces digitized speech corresponding to the values within the interactive element 202 with an indication that the webpage includes an image of a product comparison table due to the determination that user interactions for the audio output of the values from the table was not useful to the majority of the users accessing the audio output.

Figure 3:
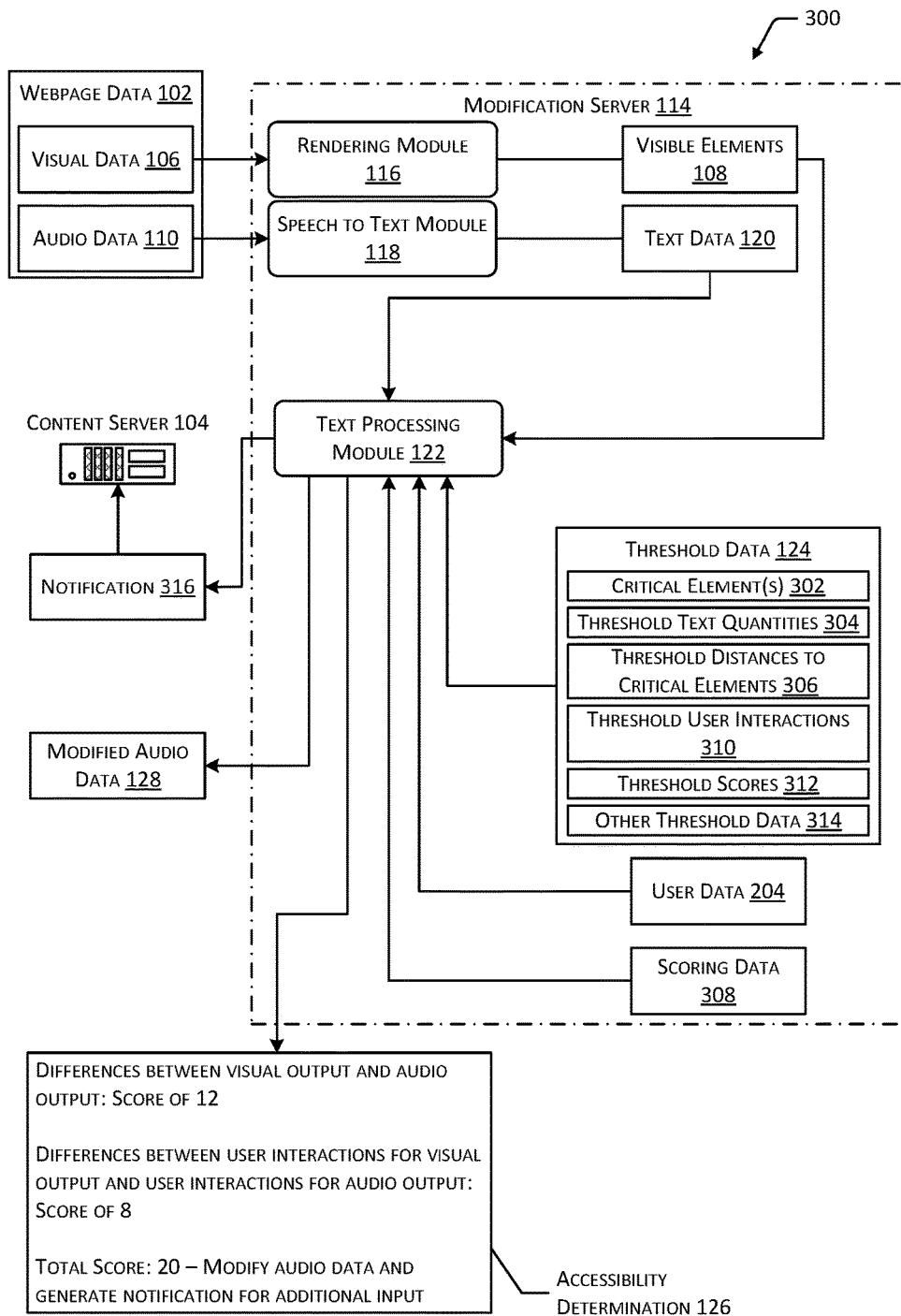
FIG. 3 depicts a system for improving the accessibility of a webpage by determining a score value associated with the web page and modifying audible elements based on the score value.

FIG. 3 depicts a system 300 for improving the accessibility of a webpage by determining a score value associated with the web page and modifying audible elements 112 based on the score value. As described with regard to FIGS. 1 and 2, a webpage may be generated using webpage data 102, which may include visual data 106 for rendering visible elements 108 and audio data 110 for producing audible elements 112, such as digitized speech representative of the visible elements 108. A rendering module 116 associated with a modification server 114 may determine the visible elements 108 based on the visual data 106. A speech to text module 118 associated with the modification server 114 may determine text data 120 based on the audio data 110. For example, the text data 120 may include a transcription of the digitized speech or other audible elements 112 associated with the audio data 110.

A text processing module 122 associated with the modification server 114 may be configured to determine differences between the visible elements 108 and the text data 120. For example, the text processing module 122 may access threshold data 124 that identifies critical elements 302 within the webpage. Continuing the example, a particular interactive element 202 within the visible elements 108, such as a button used to purchase an item, may be identified as a critical element 302. The threshold data 124 may include one or more threshold text quantities 304 associated with the critical element 302. For example, if the quantity of text in the text data 120 that is associated with the critical element 302 is less than a minimum threshold text quantity 304, the critical element 302 may not be adequately described using audible elements 112, which may hinder the accessibility thereof. As another example, if the quantity of text in the text data 120 that precedes the critical element 302 exceeds a maximum threshold text quantity 304, then the output of audible elements 112 not associated with the critical element 302 may delay a user's ability to determine the presence of the critical element 302 on the webpage. Other threshold text quantities 304 may include a minimum or maximum total quantity of text on a webpage, a maximum quantity of text associated with a critical element 302, a minimum or maximum quantity of text associated with portions of the webpage that are not critical elements 302, and so forth. The threshold data 124 may also include one or more threshold distances to critical elements 306. For example, depending on the location of audible elements 112 descriptive of a critical element 302 within the audio output, a user may access a webpage for a significant quantity of time while remaining unware of the presence of the critical element 302 in the webpage. If the temporal distance to the critical element 302 exceeds the threshold distance, this may result in modification to the audio data 110.

The text processing module 122 may access scoring data 308, which associates score values with particular differences between the visible elements 108 and the text data 120. In some implementations, the score values may be affected by the threshold data 124. For example, the a first quantity of text associated with a critical element 302 that is less than a threshold text quantity 304 may be associated with a first score value. A second quantity of text that is less than the first quantity may be associated with a second, greater score value. A complete absence of text associated with the critical element 302 may be associated with a third score value that is greater than the second score value. The scoring data 308 may also indicate score values for quantities of text associated with non-critical elements, distances between critical elements 302 and associated text, and so forth. In some implementations, score values for particular differences between the visible elements 108 and the text data 120 may be weighted. For example, a first critical element 302, such as a button to purchase a product, may include a weight greater than a second critical element 302, such as a table comparing similar products available for purchase. A lack of sufficient text describing the first critical element 302 may be associated with a greater score value than a lack of text describing the second critical element 302.

As described with regard to FIG. 2, the text processing module 122 may also access user data 204 indicative of user interactions with the visible elements 108 of the webpage and user interactions with audible elements 112 of the webpage. The text processing module 122 may determine differences between the user interactions with the visible elements 108 and those with corresponding audible elements 112, based on the threshold data 124. For example, the threshold data 124 may include threshold user interactions 310. If the user interactions for a particular visible element 108 exceed those associated with a corresponding audible element 112 by more than a quantity indicated by the threshold user interactions 310, the text processing module 122 may determine a corresponding score value based on the scoring data 308. In some cases, if the user interactions for an audible element 112 exceed those for a corresponding visible element 108, this may result in a negative score value indicating that modification of the audio data 110 is not necessary. In other implementations, a score value may be determined that may be used to cause modification of the visual data 106 based on the user interactions for the audible element 112 exceeding those for a corresponding visible element 108. In some implementations, score values for particular audible elements 112 or visible elements 108 may be weighted. For example, a difference in user interactions associated with a critical element 302 may result in a greater score value than user interactions associated with other elements.

In some implementations, the text processing module 122 may determine a total score based on multiple individual score values. For example, particular differences between visible elements 108 and the text data 120 may each be associated with respective score values. Differences between user interactions may also be associated with respective score values. The text processing module 122 may be configured to determine the sum of the individual scores, an average value (e.g., mean, mode, or median), based on the score values, and so forth. The anomaly determination 126 generated by the text processing module 122 may include the determination of a total score value associated with the webpage. Based on correspondence between one or more determined score values and the threshold data 124, which may include one or more threshold scores 312, the text processing module 122 may generate modified audio data 128, and in some implementations, one or more notifications 316 to solicit user input. Notifications 316 may be provided to the content server 104 associated with the webpage data 102, or in other implementations, to a computing device associated with a user or administrator associated with the webpage data 102. For example, if a determined score value exceeds a first threshold score 312, the text processing module 122 may modify the audio data 110 associated with a webpage to affect the audible elements 112 provided to a user. If the determined score value exceeds a greater, second threshold score 312, the text processing module 122 may generate a notification 316 requesting user input to modify the audio data 110. For example, if the audible elements 112 that correspond to a visible table comparing different items are not understandable or useful, user input, from a user associated with the webpage data 102, that describes context associated with the table may be used to modify the additional audio data 110 regarding the table.

Other threshold data 314 may include text strings or text characteristics that may be used to modify the score associated with the webpage. For example, the other threshold data 314 may indicate that repeated text strings having a length of at least a selected number of characters may be associated with a particular score values, while other target text strings may be associated with other score values. Other threshold data 314 may also include threshold values associated with user input. For example, if a threshold quantity of users provides user input associated with a particular audible element 112, a score value associated with the user input may be assigned to cause modification of the audio data 110 corresponding to the audible element 112.

Figure 4:
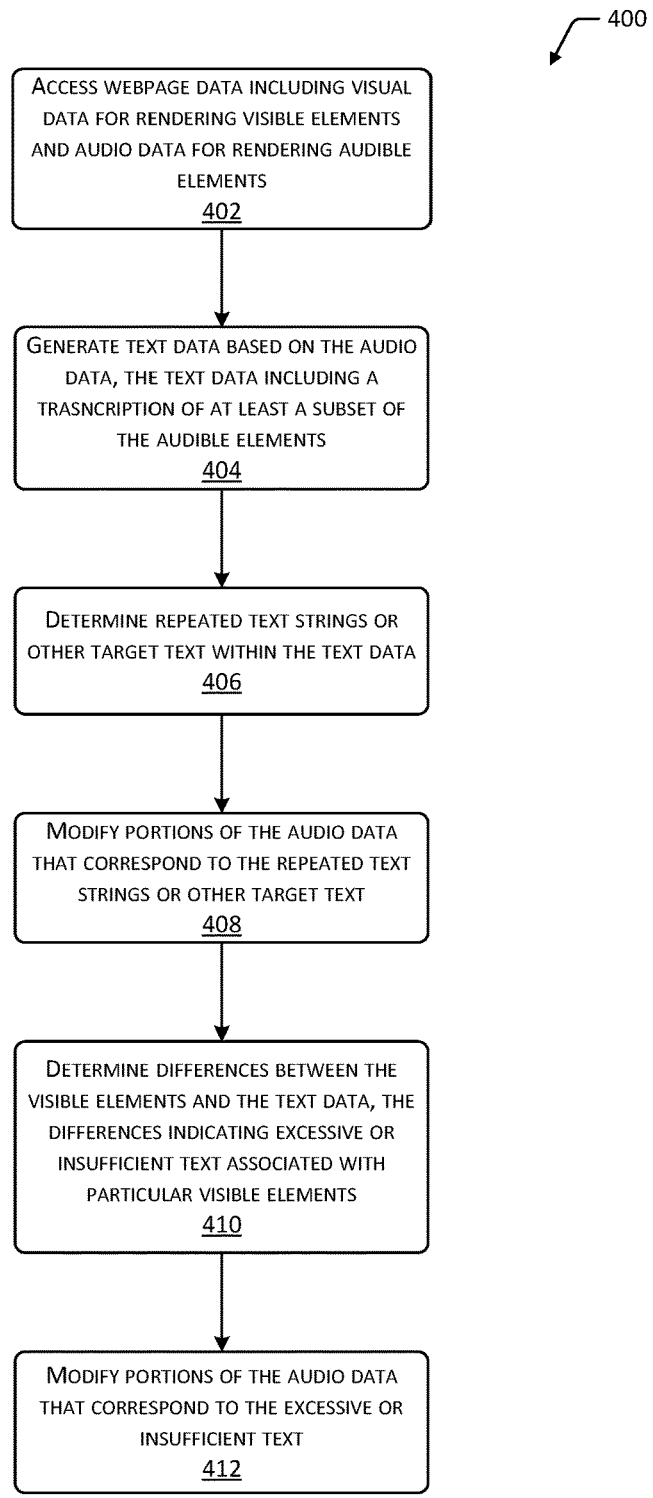
FIG. 4 is a flow diagram illustrating a method for improving the accessibility of a webpage by modifying audio data based on an analysis of text data determined from the audio data.

FIG. 4 is a flow diagram 400 illustrating a method for improving the accessibility of a webpage by modifying audio data 110 based on an analysis of text data 120 determined from the audio data 110. Block 402 accesses webpage data 102 including visual data 106 for rendering visible elements 108 and audio data 110 for rendering audible elements 112. For example, a rendered webpage may include visible elements 108 such as text, buttons, images, interfaces, and so forth. The webpage may be accompanied by audio data 110 that may be processed by a screen reading program or other audio output technology to cause the output of audible elements 112, such as digitized speech representative of at least a portion of the visible text on the webpage. Digitized speech representative of various images or other features, such as buttons, tables, menus, search interfaces, and so forth, may also be output. For example, a button having a text label may be represented using digitized speech indicating the presence of a button, followed by additional digitized speech reciting the text label of the button. In some implementations, the audible elements 112 may include sounds other than speech, such as tones, music, or other sounds used to indicate the presence or absence of various features on the webpage.

Block 404 generates text data 120 based on the audio data 110, the text data 120 including a transcription of at least a subset of the audible elements 112. In some implementations, a speech to text module 118 may process the audio data 110, with or without rendering the audio data 110, to generate alphanumeric strings representative of the audible elements 112 that correspond to the audio data 110. For example, the audible elements 112 may include digitized speech representative of visible text, images, or other features. The text data 120 may include alphanumeric strings representative of the digitized speech. Continuing the example, the text data 120 may include a transcription of the digitized speech that would be output were the audio data 110 processed to provide the audible elements 112 using a speaker or other audio output device. In some implementations, the audio data 110 may be analyzed directly without generating text data 120, and block 404 may be omitted.

Block 406 determines repeated text strings or other target text within the text data 120. For example, threshold data 124 may indicate particular target text strings or particular text patterns, such as repeated strings of text having at least a minimum length (e.g., count of characters). Continuing the example, a webpage may include multiple buttons, each having an identical text label. The digitized speech describing these buttons would therefore include repetition of an identical phrase for each button, and the corresponding text data 120 would include a repeated string of text. In addition to repeated text strings, the threshold data 124 may include text characteristics such as threshold text quantities 304. A quantity of text in excess of a threshold maximum value or less than a threshold minimum value may also be determined at block 406. In some implementations, the threshold data 124 may also identify target text strings, such as particular words, phrases, or other types of content that may not be useful to a user experiencing the audible elements 112. In some cases, target text strings may include strings having semantic irregularities. For example, a visible table or graph may not be useful to a user that is unable to see the visible elements 108 and is relying upon the audible elements 112 to understand a webpage. Therefore, text descriptive of the visible graph that includes the text string "graph" may be identified at block 406. In cases where the audio data 110 is analyzed without generating text data 120, quantities of audio data 110, such as digitized speech, may be compared to threshold values. Speech recognition techniques may be used to determine repeated audio elements, semantic irregularities in digitized speech, target speech, and so forth. For example, a database of audio fingerprints may include audio data corresponding to target speech. Correspondence between an audio fingerprint and the audio data 110 for a webpage may be used to determine the presence of target speech in the audio data 110.

Block 408 modifies portions of the audio data 110 that correspond to the repeated text strings or other target text. In some implementations, audio data 110 corresponding to repeated text strings or other target text may be deleted. In other implementations, the audio data 110 corresponding to repeated text strings or other target text may be replaced with other audio data 110. For example, repeated output of identical digitized speech associated with a series of buttons may be replaced with a single phrase describing the presence of multiple buttons. As another example, repeated output associated with a series of buttons may be replaced with alternate phrases that describe the context associated with particular buttons. Other text characteristics and target strings of text may similarly be deleted, replaced, or modified.

Block 410 determines differences between the visible elements 108 and the text data 120, the differences indicating excessive or insufficient text associated with particular visible elements 108. For example, a particular visible element 108 may include a button that is used to purchase an item. If the text data 120 lacks text associated with this button, or includes only a small quantity of text associated with the button, a user relying upon the audible elements 112 may experience difficulty accessing the button and purchasing the item. As another example, a particular visible element 108 may include a graph that may lack usefulness for users relying upon the audible elements 112 to understand a webpage. If the text data 120 includes a quantity of text associated with this graph in excess of a threshold text quantity 304, a user listening to digitized speech describing this graph may be delayed from accessing other, more useful features of the webpage.

Block 412 modifies portions of the audio data that correspond to the excessive or insufficient text. For example, excessive text that corresponds to a non-critical portion of a webpage may be moved, while audible elements 112 that describe critical elements 302 of the webpage may be output promptly after a user accesses the webpage. In some implementations, audio data 110 corresponding to excessive text or text that corresponds to non-critical portions of the webpage may be deleted. In other implementations, audio data 110 corresponding to critical elements 302 of the webpage may be replaced with audio data 110 that includes additional information. For example, responsive to a determination that no text or insufficient text exists to describe a particular visible element 108, a notification 316 may be generated requesting user input to provide additional audio data 110 descriptive of the visible element 108.

Figure 5:
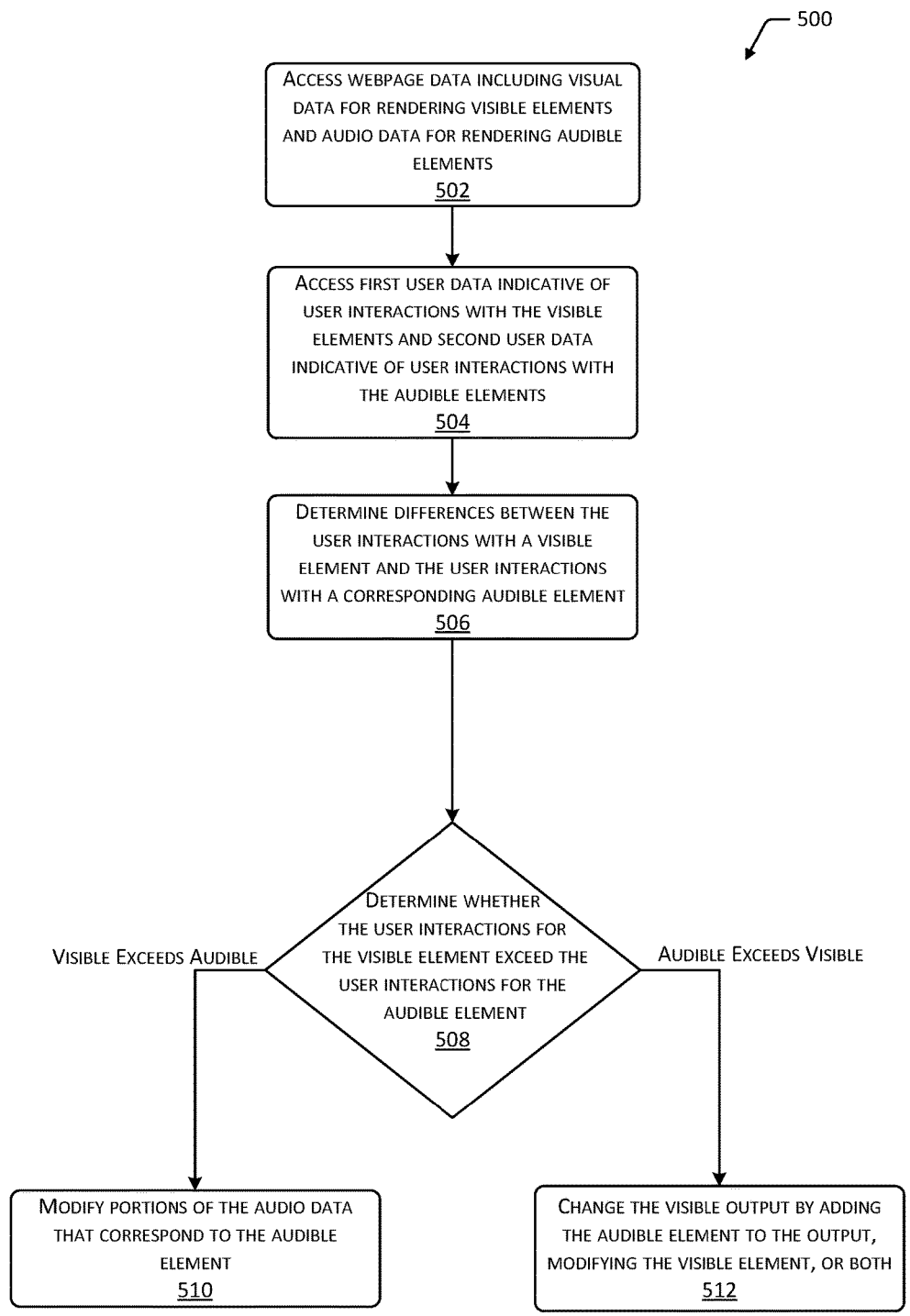
FIG. 5 is a flow diagram illustrating a method for improving the accessibility of a webpage by modifying audio data based on user interactions with audible elements of the webpage.

FIG. 5 is a flow diagram 500 illustrating a method for improving the accessibility of a webpage by modifying audio data 110 based on user interactions with audible elements 112 of the webpage. Block 502 accesses webpage data 102 including visual data 106 for rendering visible elements 108 an audio data 110 for rendering audible elements 502. A webpage may include visible elements 108 such as text, images, and interactive features, such as buttons, menus, and search interfaces. The audio data 110 may cause the output of audible elements 112, which may include digitized speech representative of at least a portion of the visible elements 108 on the webpage. For example, the audible elements 112 representative of visible text on the webpage may include a digitized voice speaking the text. The audible elements 112 representative of an interactive element 202, such as a button labeled with the text "Buy" may include an indication of the nature of the interactive element 202 followed by a transcription of the text, such as the digitized speech "Button: Buy". In some implementations, the audible elements 112 may include sounds other than speech, such as tone to represent a button, followed by digitized speech reciting the text labeling the button.

Block 504 accesses first user data 204 indicative of user interactions with the visible elements 108 and second user data 204 indicative of user interactions with the audible elements 112. For example, the user interactions may include a count of accesses for a particular feature, a dwell time of users associated with the particular feature, a positive user action (e.g., purchasing an item) responsive to the particular feature, and so forth. Continuing the example, a count of accesses or a dwell time for a visible table comparing similar products may be larger than the count of accesses or dwell time for digitized speech reciting the values present in the table. As another example, a count of accesses or dwell time for a large block of unformatted, visible text may be low, while the count of accesses or dwell time for digitized speech reciting the text may be greater. Block 506 determines differences between the user interactions with a visible element 108 and the user interactions with a corresponding audible element 112. Block 508 determines whether the user interactions with the visible element 108 exceed the user interactions for the audible element 112. Greater user interactions may be determined, for example, based on a count of accesses of an element, a total dwell time of users associated with the element, an average dwell time for the element, a count or percentage of positive user actions responsive to the element, and so forth.

If the user interactions for the visible element 108 exceed the user interactions associated with the corresponding audible element 112, block 510 may modify portions of the audio data 110 that correspond to the audible element 112. For example, if user interactions for a particular audible element 112, such as digitized speech representative of a table, are significantly less than the user interactions for the associated visible table, this may indicate that the digitized speech representative of the table is not useful output. Additionally, the output of non-useful digitized speech may hinder or delay a user's access to more useful information. The audio data 110 may be modified to delete portions of the audio data 110 that correspond to the audible element 112 or to move the portions of the audio data 110 such that the audible element 112 is experienced by a user later than other, more useful audible elements 112.

If the user interactions for the audible element 112 exceed the user interactions associated with the visible element 108, block 512 may change the visible output by adding the audible element 112 to the output, by modifying the visible element 108, or both. For example, if user interactions for digitized speech representative of a portion of the text on a webpage exceed the user interactions for the visible text, itself, this may indicate that the digitized speech more effectively conveys information than the visible text. Responsive to this determination, digitized speech typically used in conjunction with screen reading software may be output during access to a webpage by a browser, even in the absence of screen reading software. Additionally or alternatively, the visible element 108 corresponding to the digitized speech may be modified to improve the usefulness thereof, such as by removing a portion of the visible element 108, changing a format or style of the visible element 108, and so forth.

Figure 6:
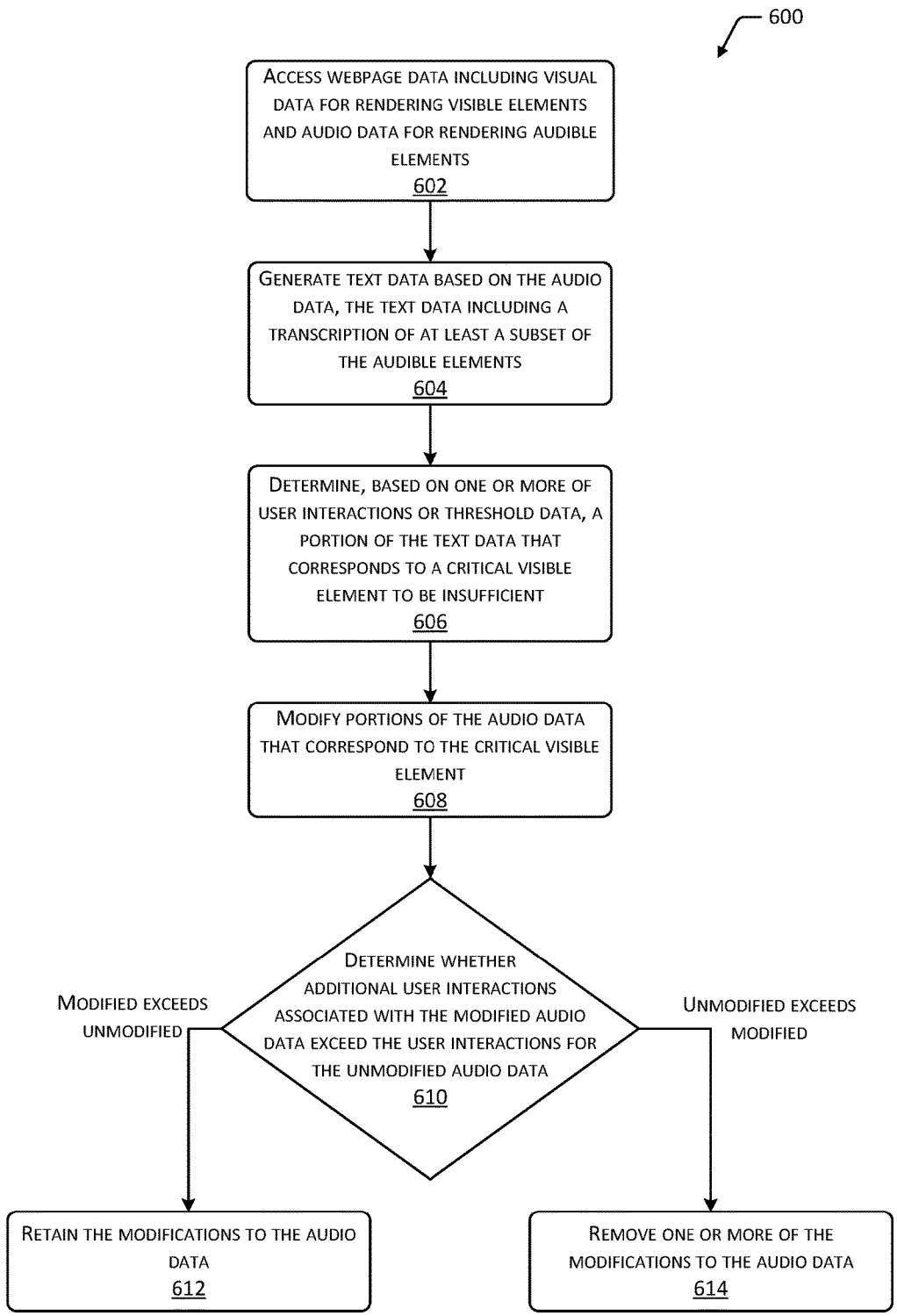
FIG. 6 is a flow diagram illustrating a method for improving the accessibility of a webpage by modifying audio data and determining user interactions associated with the modified audio data.

FIG. 6 is a flow diagram 600 illustrating a method for improving the accessibility of a webpage by modifying audio data 110 and determining user interactions associated with the modified audio data 128. Block 602 accesses webpage data 102 including visual data 106 for rendering visible elements 108 and audio data 110 for rendering audible elements 112. As discussed with regard to FIGS. 4 and 5, visible elements 108 may include text, images, interactive elements 202, and so forth, while audible elements 112 may include digitized speech representative of at least a portion of the visible elements 108, as well as one or more other sounds.

Block 604 generates text data 120 based on the audio data 110, the text data 120 including a transcription of at least a subset of the audible elements 112. For example, the text data 120 may include a transcription of digitized speech obtained by using a speech to text module 118 to process the audio data 110. Text data 120 may also include text (e.g., alphanumeric strings) that describe visible elements 108 other than text, such as images, interfaces, and so forth. In some implementations, the audio data 110 may be analyzed directly and generation of text data 120 may be omitted.

Block 606 determines, based on one or more of user interactions or threshold data 124, a portion of the text data 120 that corresponds to a critical visible element 108 to be insufficient. For example, threshold data 124 may indicate that particular visible elements 108 are critical elements 302. Continuing the example, a button used to purchase an item may be indicated as a critical element 302 for a webpage offering the item for sale. The threshold data 124 may indicate a minimum threshold quantity of text used to indicate the button. The threshold data 124 may also indicate a maximum temporal distance between the top of the webpage and the text that indicates the button. For example, if recitation of the digitized speech that precedes a critical element 302 would require a quantity of time that exceeds a threshold quantity of time, the quantity of text may hinder the ability of a user to access the critical element 302.

Block 608 may modify portions of the audio data 110 that correspond to the critical visible element 108. For example, if a quantity of text associated with a critical element 302 is less than a threshold quantity, the audio data 110 may be modified to add additional audible elements 112. If the quantity of text exceeds a threshold quantity, at least a portion of the text may be deleted. If the temporal distance between the top of the webpage and the critical element 302 exceeds a threshold separation, at least a portion of the audio data 110 may be moved or deleted.

Block 610 determines whether additional user interactions with the modified audio data 110 exceed the user interactions for the unmodified audio data 110. In some implementations, a statistical test, such as an A/B test, may be performed to determine user interactions for both the modified and unmodified versions of the audio data 110. For example, a particular version of the audio data 110 may be assigned to particular users over a period of time, and the user interactions for each version may be determined. In other implementations, the modified version of the audio data 110 may replace the previous, unmodified version of the audio data 110, and after a period of time, the user interactions for the modified version may be compared to the previous user interactions for the unmodified version.

If the user interactions for the modified version of the audio data 110 exceed the user interactions for the unmodified version, block 612 may retain the modifications to the audio data 110. If the user interactions for the unmodified version of the audio data 110 exceed those for the modified version, this determination may indicate that the modifications to the audio data 110 have decreased the usefulness thereof. Block 614 may remove one or more of the modifications to the audio data 110.

Figure 7:
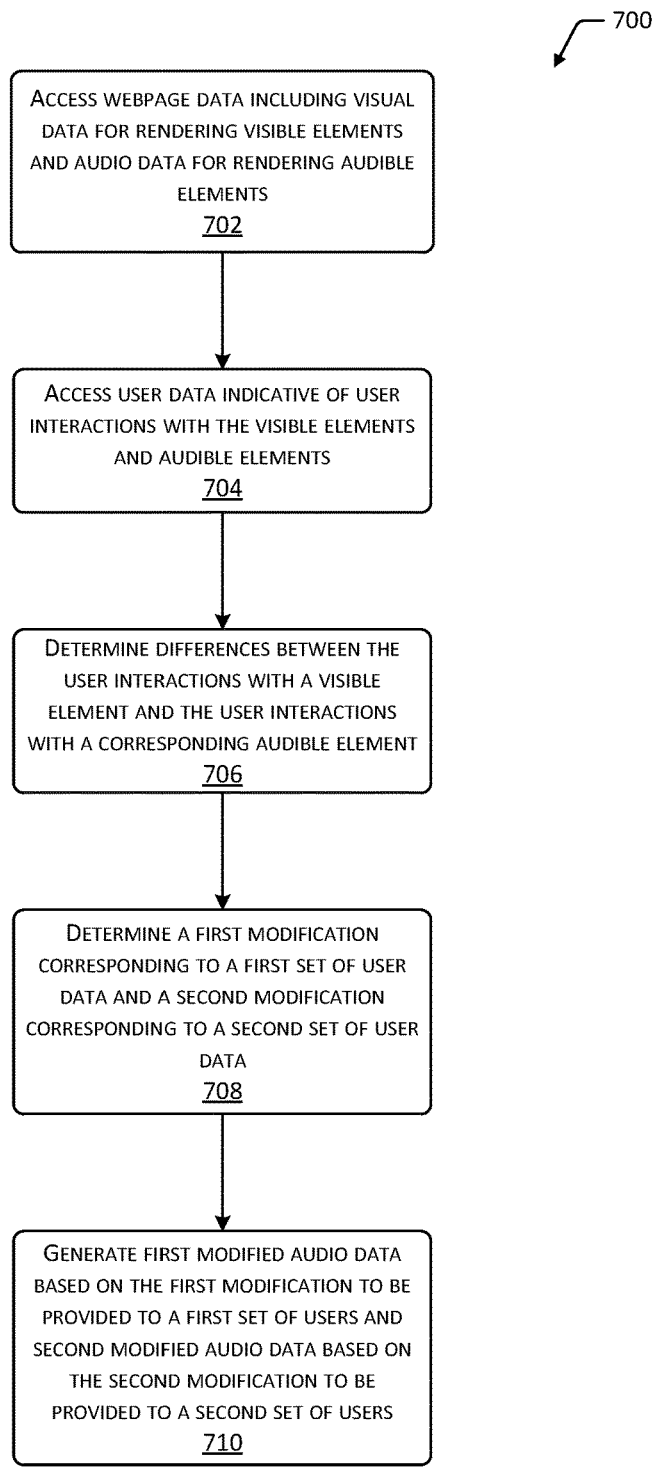
FIG. 7 is a flow diagram illustrating a method for improving the accessibility of a webpage by modifying audio data associated with the webpage to generate multiple versions of audio output based on user data.

FIG. 7 is a flow diagram 700 illustrating a method for improving the accessibility of a webpage by modifying audio data 110 associated with the webpage to generate multiple versions of audio output based on user data 204. Block 702 accesses webpage data 102 including visual data 106 for rendering visible elements 108 and audio data 110 for rendering audible elements 112.

Block 704 accesses user data 204 indicative of user interactions with the visible elements 108 and audible elements 112. User interactions may include selection or other types of access associated with particular elements, dwell time associated with the particular elements, searches associated with the particular elements, clickstream data, and so forth.

Block 706 determines differences between user interactions with a visible element 108 and user interactions with a corresponding audible element 112. For example, user data 204 may indicate that the user interactions for a visible image of a product exceed the user interactions associated with digitized speech describing the image.

Block 708 determines a first modification corresponding to a first set of user data 204 and a second modification corresponding to a second set of user data 204. For example, user data 204 may indicate characteristics of users, such as demographic information, geographic information, purchase histories, search histories, browsing histories, a history of software used to access webpages, a history of dwell times, clickstream data, and user interactions, and so forth. The user characteristics may indicate that a particular audio output may be suited for a first user, while a different audio output may cause greater user interactions with a different user having different characteristics. Continuing the example, a first user that is experienced with the use of screen reader software, selection of different webpage areas, and navigation using audio-based interfaces may find digitized speech containing information regarding an image to be useful. However, a second user that primarily relies upon visible elements 108 when navigating a webpage may be hindered by a large quantity of digitized speech and would exhibit greater user interactions when provided with a digitized speech representing a brief summary of the image. Block 710 generates first modified audio data 128 based on the first modification, to be provided to a first set of users, and second modified audio data 128 based on the second modification, to be provided to a second set of users.

Figure 8:
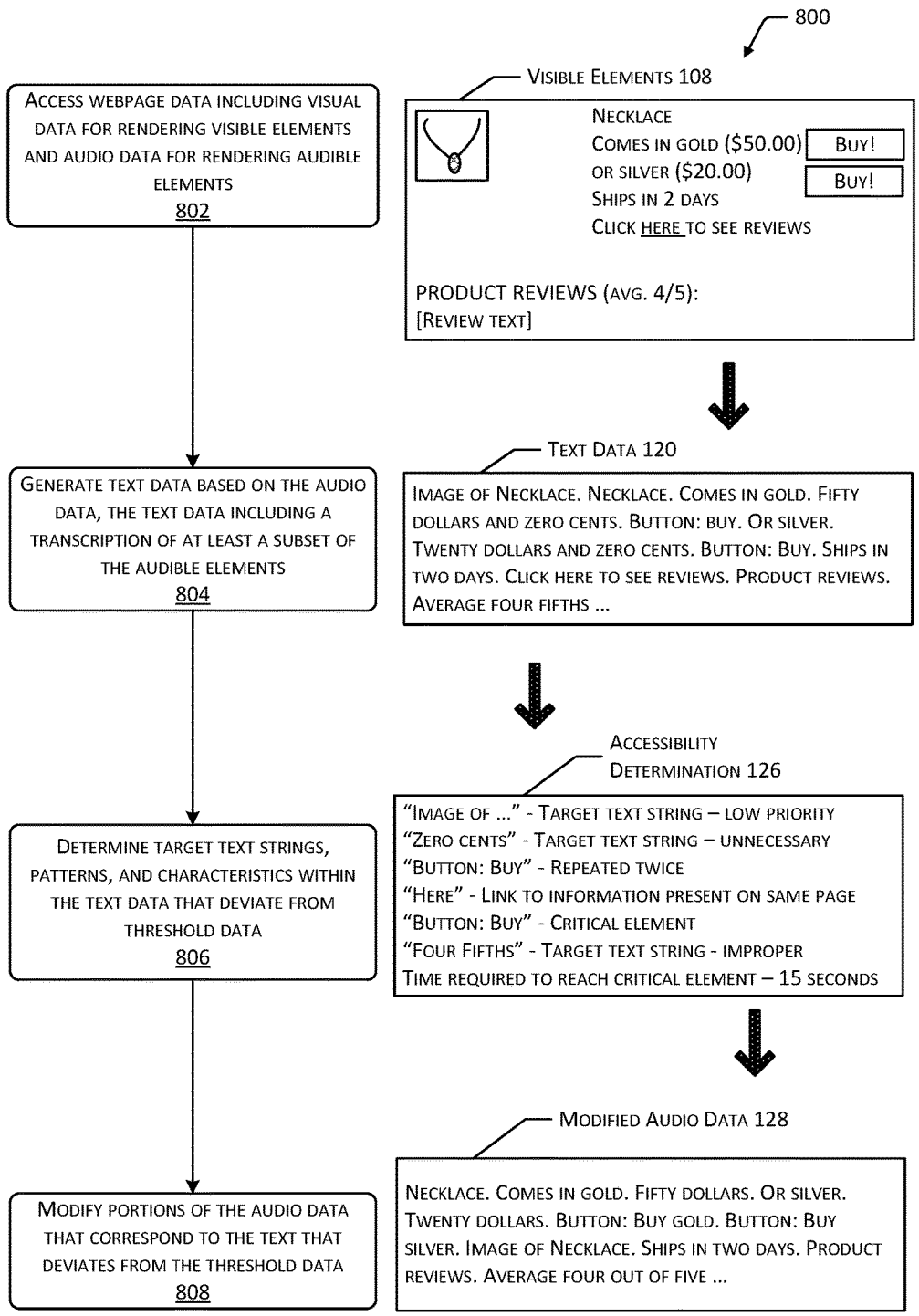
FIG. 8 is a scenario illustrating a method for modifying audio data based on characteristics of corresponding text data.

FIG. 8 is a scenario 800 illustrating a method for modifying audio data 110 based on characteristics of corresponding text data 120. At 802, webpage data 102 may be accessed. The webpage data 102 may include visual data 106 for rendering visible elements 108 and audio data 110 for rendering audible elements 112. For example, visible elements may include an image of an item for sale, text indicating a title or name of the item (e.g., "Necklace"), text describing the item or variations of the item that are available (e.g., "Comes in gold or silver" and "Ships in 2 days"), text describing the price(s) of the item (e.g., "$50.00" and "$20.00"), an interactive element 202 such as a link to other content located in another portion of the webpage (e.g., "Click here to see reviews"), such as product reviews, and the other content. The audible elements 112 may include digitized speech corresponding to at least a portion of the visible elements 108. For example, the digitized speech may indicate the presence of a non-text element, such as an image of a necklace, by reciting the language "Image of necklace". The digitized speech may also include a transcription of visible text present on the webpage.

At 804, text data 120 based on the audio data 110 may be generated. The text data 120 may include a transcription of at least a subset of the audible elements 112. For example, the text data 120 may include a transcription of the digital speech that would be output, were the audio data 110 to be processed using screen reading software. FIG. 8 depicts example text data 120 that corresponds to the depicted visible elements 108, that reads "Image of necklace. Necklace, Comes in Gold. Fifty dollars and zero cents. Button: Buy. Or silver. Twenty dollars and zero cents. Button: Buy. Ships in two days. Click here to see reviews. Product reviews. Average four fifths . . . ".

At 806, target text strings, patterns, and characteristics within the text data 120 may be determined, that deviate from threshold data 124. For example, FIG. 8 depicts an accessibility determination 126 that identifies portions of the text data 120 that may deviate from one or more threshold values. An example deviation includes the target text "Image of", which may indicate that the corresponding audible elements 112 relate to a description of an image. Because digitized speech describing an image may be of limited use to a user, the target text string "image of" may indicate low priority information that may be output after other, more useful information. Another example deviation includes the target text "zero cents", which may be unnecessary language. While a literal transcription of the visible text "$50.00" would be "fifty dollars and zero cents", the addition of unnecessary digitized speech stating the language "zero cents" may hinder or delay a user's ability to access other information. Yet another example deviation includes the target text "four fifths", which may improperly reflect an average rating for the item associated with the web page. While a literal transcription of the visible text "(4/5)" would be "four fifths", when the context that this text is associated with a product rating is determined, replacement of this literal transcription with the language "four out of five" may be determined to be appropriate.

Other deviations may include text patterns such as the repeated text "Button: Buy". The presence of two buttons that are indicated using identical digitized speech may generate user confusion. One of the recitations of this language may be deleted, or additional language may be added to at least one of the recitations to differentiate the buttons from one another. Another deviation may include use of an internal link to access other information displayed in the webpage. While use of visible links to transition between areas of a webpage may be useful for users accessing the webpage using a visual interface, such links may be less useful to users accessing the webpage using an audio interface. Because the material that is accessible using the link is also displayed on the webpage, digitized speech indicating the text associated with the link may be deleted. Yet another deviation may include a text characteristic, such as the quantity of text preceding a critical element 302, such as a button used to purchase the item. If the time required to reach a critical element 302 exceeds a threshold time, at least a portion of the audible elements that precede the critical element 302 may be deleted or moved to a location subsequent to the critical element 302. For example, the recitation of digitized speech relating to each element of the webpage prior to reaching a button to purchase the item may require fifteen seconds. If this quantity of time exceeds a threshold value, at least a portion of the digitized speech may be delated or moved to another location subsequent to the critical element 302.

At 808, one or more portions of the audio data 110 that correspond to the text that deviates from the threshold data 124 may be modified. For example, FIG. 8 depicts modified audio data 128 that may cause output of speech that recites, "Necklace. Comes in gold. Fifty dollars. Or silver. Twenty dollars. Button: Buy gold. Button: Buy silver. Image of necklace. Ships in two days. Product reviews. Average four out of five . . . ". The output associated with the example modified audio data 128 removes the language "zero cents" and "click here to see reviews", replaces the language "four fifths" with "four out of five", and moves the language "image of necklace" to a location subsequent to the buttons used to purchase the item. The modified audio data 128 also includes additional language differentiating the button elements from one another.

Figure 9:
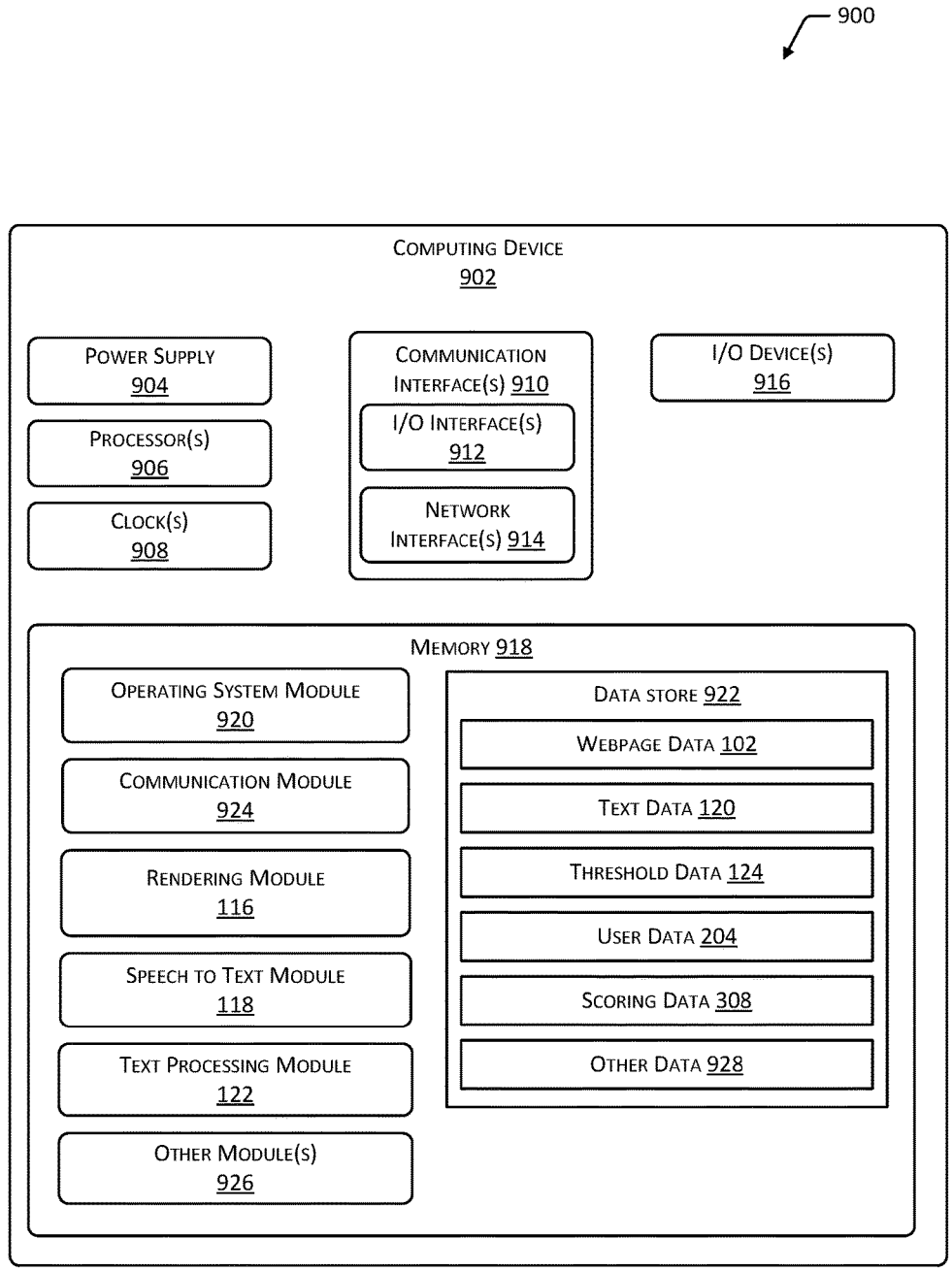
FIG. 9 is a block diagram illustrating a computing device within the scope of the present disclosure.

FIG. 9 is a block diagram 900 illustrating a computing device 902 within the scope of the present disclosure. The computing device 902 may include one or more modification servers 114, content servers 104, or other computing devices 902 in communication therewith, such as user devices used to access content provided by content servers 104. Any number and any type of computing device 902 may be used to perform the functions described herein.

One or more power supplies 904 may be configured to provide electrical power suitable for operating the components of the computing device 902. In some implementations, the power supply 904 may include a rechargeable battery, fuel cell, photovoltaic cell, power conditioning circuitry, and so forth.

The computing device 902 may include one or more hardware processor(s) 906 (processors) configured to execute one or more stored instructions. The processor(s) 906 may include one or more cores. One or more clocks 908 may provide information indicative of date, time, ticks, and so forth. For example, the processor(s) 906 may use data from the clock 906 to generate a timestamp, trigger a preprogrammed action, and so forth.

The computing device 902 may include one or more communication interfaces 910, such as input/output (I/O) interfaces 912, network interfaces 914, and so forth. The communication interfaces 610 may enable the computing device 902, or components of the computing device 902, to communicate with other computing devices 902 or components thereof. The I/O interfaces 912 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 912 may couple to one or more I/O devices 916. The I/O devices 916 may include any manner of input device or output device associated with the computing device 902 or with another computing device 902 in communication therewith. For example, I/O devices 916 may include touch sensors, keyboards, mouse devices, microphones, image sensors (e.g., cameras), scanners, displays, speakers, haptic devices, printers, and so forth. In some implementations, the I/O devices 916 may be physically incorporated with a computing device 902 or may be externally placed.

The network interfaces 914 may be configured to provide communications between the computing device 902 and other devices, such as the I/O devices 916, routers, access points, and so forth. The network interfaces 914 may include devices configured to couple to one or more networks including local area networks (LANs), wireless LANs, wide area networks (WANs), wireless WANs, and so forth. For example, the network interfaces 914 may include devices compatible with Ethernet, Wi-Fi®, Bluetooth®, ZigBee®, Z-Wave®, 3G, 4G, LTE, and so forth.

The computing device 902 may include one or more busses or other internal communications hardware or software that allows for the transfer of data between the various modules and components of the computing device 902.

As shown in FIG. 9, the computing device 902 may include one or more memories 918. The memory 918 may include one or more computer-readable storage media (CRSM). The CRSM may be any one or more of an electronic storage medium, a magnetic storage medium, an optical storage medium, a quantum storage medium, a mechanical computer storage medium, and so forth. The memory 918 may provide storage of computer-readable instructions, data structures, program modules, and other data for the operation of the computing device 902. A few example modules are shown stored in the memory 918, although the same functionality may alternatively be implemented in hardware, firmware, or as a system on a chip (SoC).

The memory 918 may include one or more operating system (OS) modules 920. The OS module 920 may be configured to manage hardware resource devices such as the I/O interfaces 912, the network interfaces 914, the I/O devices 916, and to provide various services to applications or modules executing on the processors 906. The OS module 920 may implement a variant of the FreeBSD™ operating system as promulgated by the FreeBSD® Project; UNIX® or a UNIX-like operating system; a variation of the Linux™ operating system as promulgated by Linus Torvalds; the Windows® operating system from Microsoft Corporation of Redmond, Wash., USA; or other operating systems.

A data store 922 and one or more of the following modules may also be stored in the memory 918. The modules may be executed as foreground applications, background tasks, daemons, and so forth. The data store 922 may use a flat file, database, linked list, tree, executable code, script, or other data structure to store information. In some implementations, the data store 922 or a portion of the data store 922 may be distributed across one or more other devices including other computing devices 902, network attached storage devices, and so forth.

A communication module 924 may be configured to establish communications with content servers 104, modification servers 114, user devices, or other computing devices 902.

The memory 918 may also store the rendering module 116. The rendering module 116 may be configured to process webpage data 102 to prepare output. For example, a rendering module 116 may prepare visible elements 108 for output based on visual data 106 and audible elements 112 for output based on audio data 110. The processing of rendering the webpage data 102 may be performed with or without providing the rendered data to an output device for output to a user. For example, visual data 106 may be rendered to enable the corresponding visible elements 108 to be compared with other data, such as text data 120 based on the audio data 110, without necessarily outputting the visible elements 108 to a display. Similarly, audio data 110 may be used to generate text data 120 without necessarily outputting the corresponding audible elements 112 to a speaker.

While webpage data 102 corresponding to a webpage is provided as an example of content that may be processed and analyzed by the computing device 902, other implementations may include analysis of other types of content. For example, the rendering module 116 may include other types of modules suitable for determining the output associated with other types of content, such as image files, audio files, video files, database records, and so forth.

The memory 918 may additionally store the speech to text module 118. The speech to text module 118 may generate text data 120 based on digitized speech, human speech, or other audible sounds. Additionally, the speech to text module 118 may be configured to generate text data 120 based on audio data 110 corresponding to audible sounds that may not necessarily be output. For example, the webpage data 102 may include audio data 110 configured to cause the output of audible elements 112. In some implementations, the speech to text module 118 may generate text data 120 based on the audio data 110 without causing the audible elements to be output to a speaker. In some cases, the speech to text module 118 may also generate text data 120 based on other types of sounds. For example, the speech to text module 118 may be configured to generate the text "ding" or "beep" responsive to audio data 110 that produces a tone.

In some implementations, the speech to text module 118 may also include a text to speech module that may be used to generate audio data 110 based on alphanumeric data. Other modules 926 in the memory may include image recognition modules, optical character recognition (OCR) modules, or other types of modules that may be used to generate text data 120 based on the webpage data 102. For example, an image recognition module may operate in conjunction with a speech to text module 118 to generate text data 120 representative of multiple types of elements within a webpage.

The memory 918 may further store the text processing module 122. The text processing module 122 may determine correspondence between the text data 120 and threshold data 124 to identify target text strings, text patterns, or text characteristics within the text data 120. For example, the text processing module 122 may determine repeated text strings in the text data 120. As another example, the text processing module 122 may determine quantities of text associated with particular elements to exceed or fall below corresponding threshold values. As yet another example, the text processing module 122 may determine a physical or temporal separation between quantities of text and particular elements to exceed or fall below a corresponding threshold separation. As an additional example, the text processing module 122 may determine semantic errors associated with the text data 120.

The text processing module 122 may also determine user data 204 associated with the webpage data 102. For example, the user data 204 may be indicative of user interactions with particular visible elements 108 and audible elements 112 of the webpage. The text processing module 122 may determine differences between user interactions with a particular visible element 108 and a corresponding audible element 112.

The text processing module 122 may generate modified audio data 128 based on the correspondence between the text data 120 and threshold data 124 and the differences in user interactions determined from the user data 204. In some implementations, the text processing module 122 may cause a notification 316 to be generated. For example, a notification 316 may request user input regarding the manner in which a particular audible element 112 may be modified.

Other modules 926 may also be present in the memory 918. For example, encryption modules may be used to encrypt and decrypt communications between computing devices 902. The other modules 926 may also include modules for receiving user input to configure the threshold data 124, to provide modified audio data 128 responsive to a notification 304, and so forth. Other modules 926 may further include machine learning modules configured to dynamically modify threshold data 124 or audio data 110 based on user interactions or identified characteristics of text data 120.

Other data 928 within the data store 922 may include user input data, such as configurations and settings associated with computing devices 902. Other data 928 may also include security data, such as encryption keys and schema, access credentials, and so forth.

In different implementations, different computing devices 902 may have different capabilities or capacities. For example, modification servers 114 and content servers 104 may have significantly more processor 906 capability and memory 918 capacity compared to the processor 906 capability and memory 918 capacity of user devices that access content provided by the content servers 104.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. An artificial intelligence system comprising:
   one or more memories storing computer-executable instructions; and
   one or more hardware processors, to execute the computer-executable instructions to:
      access webpage data including visual data for rendering visible elements of a webpage and audio data for rendering audible elements that include speech representative of at least a subset of the visible elements of the webpage;
      generate text data based on the audio data using a speech-to-text module, the text data including a transcription of the audible elements;
      determine, based on the text data, one or more of:
         a repeated string in the text data;
         a semantic error in the text data;
         a total quantity of text, in the text data, that exceeds a threshold total quantity;
         a quantity of text, in the text data, that corresponds to a particular visible feature of the webpage, that is less than a threshold minimum value;
         a quantity of text, in the text data, that corresponds to the particular visible feature, that is greater than a threshold maximum value; or
         a separation between at least a portion of the text data and the particular visible feature that exceeds a threshold separation;
      access first user data indicative of first user interactions with a visible element of the webpage;
      determine an audible element that corresponds to the visible element;
      access second user data indicative of second user interactions with the audible element;
      determine one or more differences between the first user data and the second user data, the one or more differences indicating that the first user interactions with the visible element exceed the second user interactions with the audible element; and
      based on the text data and the one or more differences, modify the audio data by one or more of:
         removing at least a portion of the audible element;
         moving the audible element from a first location in the webpage to a second location subsequent to the first location; or
         modifying a portion of the audio data that corresponds to the one or more of the repeated text string, the semantic error, the total quantity of text that exceeds the threshold quantity, the quantity of text that is less than the threshold minimum value, the quantity of text that is greater than the threshold maximum value, or the separation.

2. The system of claim 1, further comprising computer-executable instructions to:
   determine a first score value for the webpage based on the text data and first scoring data, wherein the first scoring data associates score values with differences between the text data and the visual data;
   determine a second score value for the webpage based on correspondence between the one or more differences and second scoring data that associates the score values with differences between the first user data and the second user data;
   determine a total score value for the webpage based on the first score value and the second score value; and
   generate one or more notifications for user review of the webpage based on correspondence between the total score value and a threshold value.

3. The system of claim 1, further comprising computer-executable instructions to:
   determine, based on the webpage data, that the webpage includes one or more sections;
   determine at least a subset of the one or more sections that include an interactive feature;
   determine one or more differences between the text data and the visual data associated with the at least a subset of the one or more sections, the one or more differences between the text data and the visual data indicating one or more of:
      a quantity of text, associated with the interactive feature, that is less than a threshold quantity of text;
      absence of text associated with the interactive feature; or
      a separation between the interactive feature and the text data associated with the interactive feature; and
   further modify the audio data based at least in part on the one or more differences between the text data and the visual data.

4. The system of claim 1, further comprising computer-executable instructions to:
   provide a modified webpage including modified audible elements based on modified audio data to one or more user devices;
   determine third user data indicative of user interactions with the modified audible elements;
   determine one or more differences between the third user data and the second user data, the one or more differences between the third user data and the second user data indicating that user interactions with the audible element of the webpage exceed user interactions with the modified audible element of the modified webpage; and
   remove one or more modifications to the audio data.

5. A method comprising:
   accessing visual data associated with a visible element of a first version of content;

accessing audio data associated with an audible element of a second version of the content, wherein the audible element corresponds to the visible element;
determining first user data indicative of first user interactions with the visible element;
determining second user data indicative of second user interactions with the audible element;
determining one or more differences between the first user data and the second user data;
generating text data representing at least a portion of the audio data;
determining, based on the text data, one or more of:
a repeated text string in the text data;
a semantic error in the text data;
a total quantity of text, in the text data, that exceeds a threshold total quantity;
a quantity of text, in the text data, that corresponds to a particular visible feature of the first version, that is less than a threshold minimum value;
a quantity of text, in the text data, that corresponds to the particular visible feature, that is greater than a threshold maximum value; or
a separation between at least a portion of the text data and the particular visible feature of the first version that exceeds a threshold separation; and
based on the text data and the one or more differences, modifying the audio data associated with the audible element by modifying a portion of the audio data that corresponds to the one or more of the repeated text string, the semantic error, the total quantity of text that exceeds the threshold total quantity, the quantity of text that is less than the threshold minimum value, the quantity of text that is greater than the threshold maximum value, or the separation.

6. The method of claim 5, wherein the audio data includes digitized speech and at least a portion of the text data includes a transcription of at least a portion of the digitized speech, and wherein the modifying of the audio data further includes one or more of: deleting a portion of the audio data corresponding to the repeated text string, modifying the audio data corresponding to the semantic error, modifying the audio data to change the quantity of text that corresponds to the particular visible feature, modifying the audio data to change the total quantity of text, or modifying the audio data to change a length associated with the separation.

7. The method of claim 5, further comprising:
determining, based on the first user data and the second user data, that the first user interactions for the visible element exceed the second user interactions for the audible element;
wherein modifying the audio data includes one or more of removing at least a portion of the audible element or moving the audible element from a first location in the content to a second location subsequent to the first location.

8. The method of claim 5, further comprising:
determining, based on the first user data and the second user data, that the first user interactions for the visible element are less than the second user interactions for the audible element; and
modifying the first version of the content to include the audible element.

9. The method of claim 5, further comprising:
determining third user data indicative of third user interactions with a modified version of the content subsequent to the modifying of the audio data;
determining, based on the second user data and the third user data, that the second user interactions for the second version of the content exceed the third user interactions for the modified version of the content; and
removing one or more modifications to the audio data.

10. The method of claim 5, further comprising:
determining a score value for the second version of the content based on the one or more differences and scoring data, wherein the scoring data associates score values with differences between the visual data and the audio data;
determining correspondence between the score value and a threshold value; and
wherein the modifying of the audio data is performed based at least in part on the correspondence between the score value and the threshold value.

11. The method of claim 5, wherein the audio data includes digitized speech, the method further comprising:
receiving user input indicating a portion of the digitized speech;
determining a portion of the audio data that corresponds to the portion of the digitized speech;
determining one or more differences between the portion of the audio data and a corresponding portion of the first version of the content; and
modifying at least a subset the audio data associated with the portion of the digitized speech.

12. The method of claim 5, further comprising:
determining a section of the first version of the content that includes an interactive feature;
determining a portion of the audio data that corresponds to the section;
determining one or more of:
a quantity of audio data associated with the interactive feature that is less than a threshold quantity;
absence of audio data associated with the interactive feature; or
a separation between the interactive feature and the quantity of audio data associated with the interactive feature; and
further modifying the audio data based at least in part on the one or more of the quantity of audio data, the absence of audio data, or the separation.

13. A system comprising:
one or more memories storing computer-executable instructions; and
one or more hardware processors, to execute the computer-executable instructions to:
access visual data associated with a visible element of a first version of content;
access audio data associated with an audible element of a second version of the content, wherein the audible element corresponds to the visible element;
generate text data based on the audio data;
determine, based on the text data, one or more of:
a repeated string in the text data;
a semantic error in the text data;
a total quantity of text, in the text data, that exceeds a threshold total quantity;
a quantity of text, in the text data, that corresponds to a particular visible feature of the first version, that is less than a threshold minimum value;
a quantity of text, in the text data, that corresponds to the particular visible feature, that is greater than a threshold maximum value; or a separation between at least a portion of the text data and the particular visible feature that exceeds a threshold separation;

determine first user data indicative of first user interactions associated with the visible element;

determine second user data indicative of second user interactions associated with the audible element;

determine, based on the first user data and the second user data, that the first user interactions exceeded the second user interactions, and further based on the text data, modify one or more of the visual data or the audio data by one or more of:

removing a portion of the visible element;

removing a portion of the audible element;

moving the portion of the visible element from a first location to a second location;

moving the portion of the audible element from a third location to a fourth location; or modifying a portion of the audio data that corresponds to the one or more of the repeated text string, the semantic error, the total quantity of text that exceeds the threshold quantity, the quantity of text that is less than the threshold minimum value, the quantity of text that is greater than the threshold maximum value, or the separation.

14. The system of claim 13, further comprising computer-executable instructions to:

determine, based on the audio data and the visual data, one or more differences between the first version of the content and the second version of the content; and based on the one or more differences, further modify the audio data.

15. The system of claim 13, wherein the audio data includes digitized speech, and wherein the text data includes a transcription of at least a portion of the digitized speech.

16. The system of claim 13, further comprising computer-executable instructions to:

determine, based on the second user data, a first set of user characteristics and a second set of user characteristics;

wherein modifying the one or more of the visual data or the audio data includes generating a first audio version of the content and a second audio version of the content, the first audio version including one or more features that correspond to the first set of user characteristics and the second audio version including one or more features that correspond to the second set of user characteristics.

17. The system of claim 13, further comprising computer-executable instructions to:

determine, based on the first user data and the second user data, that user interactions associated with a second element of the first version of the content are less than user interactions associated with a portion of the second version of the content that corresponds to the second element; and modify the second element of the first version of the content.

18. The system of claim 13, further comprising computer-executable instructions to:

provide a modified version of the content based on a modified version of the one or more of the visual data or the audio data to one or more user devices;

determine third user data indicative of third user interactions with the modified version of the content;

determine, based on the second user data and the third user data, that the third user interactions associated with the second version of the content exceed the second user interactions associated with the modified version of the content; and remove one or more modifications to the one or more of the visual data or the audio data.

19. The system of claim 13, further comprising computer-executable instructions to:

determine a score value for the second version of the content based on the first user data, the second user data, and scoring data, wherein the scoring data associates score values with differences between sets of user data; and determine correspondence between the score value and modification data, wherein the modification data associates modifications with the score values;

wherein modifying of the audio data is performed based at least in part on the correspondence between the score value and the modification data.

20. The system of claim 13, wherein the audio data includes digitized speech, the system further comprising computer-executable instructions to:

generate text data based on the audio data;

receive user input indicating a portion of the digitized speech;

determine a portion of the text data that corresponds to the portion of the digitized speech;

determine a portion of the audio data that corresponds to the portion of the text data;

determine one or more differences between the portion of the text data and a corresponding portion of the first version of the content; and modify the portion of the audio data.

* * * * *

UNITED STATES PATENT AND TRADEMARK OFFICE
CERTIFICATE OF CORRECTION

PATENT NO. : 10,141,006 B1
APPLICATION NO. : 15/194282
DATED : November 27, 2018
INVENTOR(S) : Alexandru Burciu Page 1 of 1

It is certified that error appears in the above-identified patent and that said Letters Patent is hereby corrected as shown below:

In the Claims

Claim 13, Column 25, Lines 10-12:
It currently reads:
determine, based on the first user data and the second user data, that the first user interactions exceeded the second user interactions, and further based on the text data, modify one or more of the visual data or the audio data by one or more of:

Where it should read:
determine, based on the first user data and the second user data, that the first user interactions exceeded the second user interactions; and removing a portion of the visible element; removing a portion of the audible element;

Signed and Sealed this
Fifth Day of February, 2019

Andrei Iancu
*Director of the United States Patent and Trademark Office*